United States Patent [19]
Panhard

[11] 3,780,706
[45] Dec. 25, 1973

[54] OBTURATING DEVICE FOR THE INTAKE PIPE OF AN INTERNAL COMBUSTION ENGINE, ESPECIALLY FOR A ROTARY PISTON ENGINE

[75] Inventor: Jean Panhard, Paris, France

[73] Assignee: Societe De Constructions Mecaniques Panhard & Levassor

[22] Filed: July 9, 1971

[21] Appl. No.: 161,063

[30] Foreign Application Priority Data
July 10, 1970 France.................. 7025860

[52] U.S. Cl.................. 123/8.01, 251/228, 418/61
[51] Int. Cl............................................. F02b 53/06
[58] Field of Search............. 123/8.13, 8.01, 90.24, 123/90.25, 188 S, 188 GC, 188 R, 191 O; 251/228; 418/61

[56] References Cited
UNITED STATES PATENTS

| | | | |
|---|---|---|---|
| 3,265,046 | 8/1966 | Paschke | 123/8.13 |
| 3,485,219 | 12/1969 | Hamada | 123/8.13 |
| 3,587,534 | 6/1971 | Weichelt | 123/8.13 |
| 2,394,471 | 2/1946 | Paul | 251/228 |

Primary Examiner—Clarence R. Gordon
Attorney—Waters, Roditi, Schwartz and Nissen

[57] ABSTRACT

The device includes a valve adapted to be closed, when the intake of fuel is reduced, to prevent the entry of burnt gases into the intake pipe. The valve is actuated by a mechanism arranged so that the valve can be fully opened and can shut the intake pipe at a short distance from the peripheral surface of the combustion chamber of the engine. The device is especially useful for rotary piston engines with peripheral ports.

1 Claim, 2 Drawing Figures

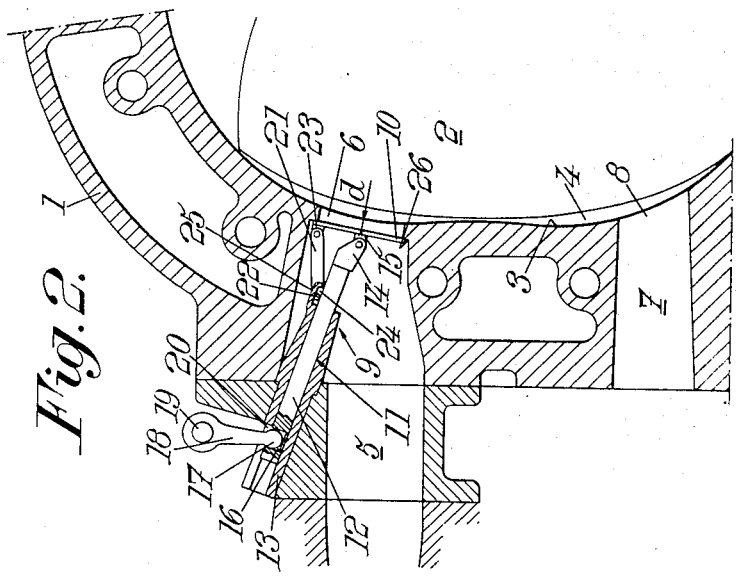
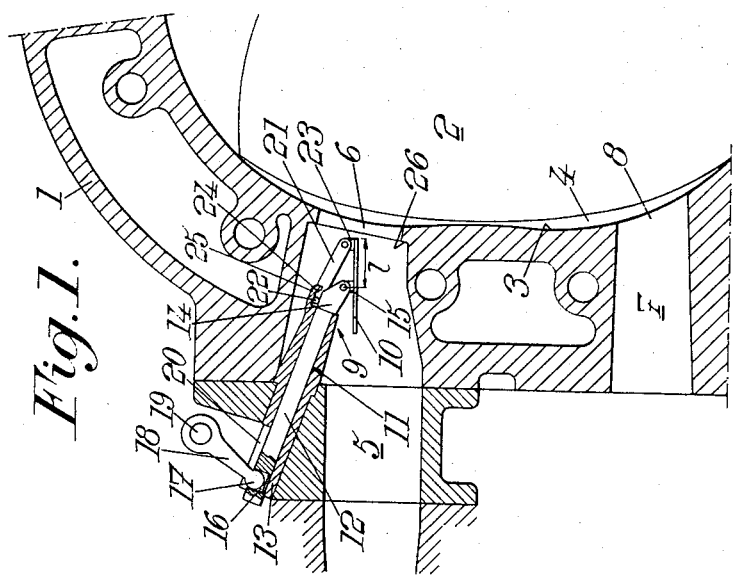

OBTURATING DEVICE FOR THE INTAKE PIPE OF AN INTERNAL COMBUSTION ENGINE, ESPECIALLY FOR A ROTARY PISTON ENGINE

The invention relates to an obturating device for the intake pipe of an internal combustion engine, which engine, on one hand, is supplied with fuel through a supply device comprising means adapted to ensure suitable metering of air and of fuel, under all operational conditions of the engine and, on the other hand, is provided with at least one intake port and one exhaust port of which the opening and closing are actuated by the piston of the engine, the said intake and exhaust ports communicating between themselves during a fraction of a cycle, this obturating device comprising a valve adapted to be closed, when the intake of fuel is reduced, to prevent the entry of burnt gases into the intake pipe.

The invention relates more particularly, because it is in this case that its applications seems to be most advantageous, but not exclusively, among these engines, to rotary piston engines with peripheral ports.

Of course, in engines of the above-specified type and especially in rotary piston engines, the intake and exhaust ports are placed in communication, during a fraction of a cycle, by reason of the geometry of the piston and of the engine. When the engine operates, a portion of the burnt gases not yet evacuated through the exhaust port is sucked towards the intake pipe at the moment when communication is established between the intake and exhaust ports. In the cases where the supply of fuel is reduced these burnt gases, which are introduced into the intake pipe and into the combustion chamber in the course of constitution, form with the fresh gases, admitted in relatively small amount, an imperfect mixture of which the ignition is aleatory. Irregular or knocking operation of the engine results therefrom.

It has already been proposed, to prevent the entry of burnt gases into the intake pipe or, at least, to reduce the dead volume into which the burnt gases can penetrate, to arrange, in the intake pipe, in the vicinity of the intake port, a valve adapted to be closed when the load of the engine, that is to say the opening of the butterfly valve, is small. Since the intake pipe assuming generally circular cross section, this valve has the shape of a disc and is mounted on an axis of rotation extending along the diameter of this disc. Under these conditions, the said axis must occur sufficiently withdrawn from the intake port for, on opening of the said valve, no portion of the latter becoming a projection into the combustion chamber of the engine. In practice, the axis of rotation of the disc must be separated from the peripheral surface of the combustion chamber by a distance at least equal to the radius of this disc. As a result the burnt gases can occupy a non-negligible volume of the intake pipe, comprised between the valve when it is closed and the intake port, of which the axial length is at least equal to the radius of the valve.

It is a particular object of the invention to render the abovesaid obturating devices such that they respond to the various exigencies of practice better than hitherto and especially such that they no longer present, to the least degree, the drawbacks mentioned above of the prior art.

An obturating device of the type specified above, according to the invention, is characterized by the fact that the valve is actuated by a mechanism arranged so that the said valve, on one hand, can be fully opened and oriented in a direction substantially parallel to the axis of the intake pipe at the level of the said valve and, on the other hand, can be oriented transversely to this axis to close the intake pipe at a distance from the peripheral surface of the combustion chamber of the engine along the said axis, less than one half of the dimension, of the valve when the latter is fully opened, the assembly being such that the said valve does not project into the combustion chamber of the engine at any time, whether it is open or closed or in an intermediate position.

The actuating mechanism of the valve comprises:

on one hand a rod adapted to slide in a sleeve, inclined on the abovesaid axis towards the intake port, one end of the said rod projecting into the said intake pipe, the middle portion of the said valve being articulated on this end, the other end of the rod being connected to a member actuating the longitudinal movements of the said rods, preferably as a function of the load of the engine, and, on the other hand, a link of which one end is articulated on a pivot mounted in the abovesaid sleeve, and on the other end of which is articulated a portion of the valve situated, when the latter is opened, nearest the intake port.

Preferably, the pivot of the link is mounted in an elongated housing in the direction of the axis of the sleeve and is adapted to be moved in the said housing in the course of the movements of opening and closing of the valve.

The invention consists, apart from the features mentioned above, of certain other features which are used preferably at the same time and which will be more explicitly considered below, with regard to a preferred embodiment of the invention which will now be described in more detailed manner with reference to the accompanying drawing, but which is provided purely by way of illustrative example and in no way limiting.

In the drawing :

FIG. 1 shows in cross-section, one embodiment of an obturating device constructed according to the invention, mounted on a rotary piston engine, shown partially ; and FIG. 2 shows similarly to FIG. 1, the obturating device in its closed position.

The drawing relates to the application of the invention to a rotary piston engine of which the casing 1 and the rotary piston 2 have been partly shown.

The casing 1 is bounded internally by a cylindrical peripheral surface 3 of which the cross-section has the shape of a two-lobed trochoid. The piston 2 has the shape of a prism with a curvilinear triangular cross-section, of which the edges cooperate with the inner surface 3 of the casing 1. The surface 3 constitutes the peripheral surface of the combustion chamber of the engine. Lateral flanges (not shown), bound with the surface 3 an inner space divided by the piston 2 into working chambers such as the chamber 4.

The engine comprises at least one intake pipe 5 which passes through the casing 1 and opens into the inside of the latter through an intake port 6. A supply device such as a carburetter (not shown) is provided on the said pipe 1 upstream of the intake port 6 and supplies the engine with the carburetted mixture.

The supply device comprises a main throttle member or butterfly valve (not shown) mounted in the pipe 5 and actuated by an accelerator.

The engine also comprises an exhaust pipe 7 passing through the casing 1 and communicating with the inner space of the said casing through an exhaust port 8.

The opening and closing of the intake 6 and exhaust 8 ports are actuated by the piston 2 of the engine. It is seen from the drawing, that in the course of its rotary movement, the piston 2 occupies, during a fraction of a cycle, positions such that the intake 6 and exhaust 8 ports communicate between one another.

An obturating device 9 of the intake pipe 5 is provided to prevent, when the engine operates with the butterfly valve closed or slightly opened, that is to say at partial load, in deceleration or at slow speed, the entry of the burnt gases into said intake pipe 5.

The obturating device 9 comprises a valve 10 actuated by a mechanism 11 arranged so that the said valve, on one hand, can be fully opened and oriented in a direction sustantially parallel to the axis of the intake pipe (see FIG. 1) and, on the other hand, can be oriented transversely to the axis of the said pipe 5, at the level of the valve 10, to close this pipe at an average distance $d$ (see FIG. 2) from the peripheral surface 3 of the combustion chamber of the engine, less than half $l$ (FIG. 1) of the dimension, along the said axis, of the valve 10 when the latter is open.

In general, the intake pipe 5 has circular cross sections and the valve 10 is constituted by a flat disc.

The actuating mechanism 11 comprises a cylindrical rod 12 adapted to slide in a sleeve 13. This rod is inclined to the abovesaid axis of the intake pipe and projects, in the direction of the intake port 6, into the portion of the pipe 5 which passes through the casing 1.

The rod 12 bears, at one end, a yoke 14 which projects, from the sleeve 13, into the intake pipe 5. On this yoke 14 there is articulated a lug 15 rigidly fixed to the middle portion of the valve 10.

The other end of the rod 12 comprises a housing 16 adapted to cooperate with a flat element 17, with circular contour, in the form of pastille, borne by a member actuating the longitudinal movements of the rod 12 as a function of the load of the engine.

This actuating member is advantageously constituted by a finger 18 adapted to turn with an axis 19 connected in rotation to the control of the butterfly valve. The finger 18 occupies the position shown in FIG. 1 when the load on the engine is maximal or almost so, that is to say when the butterfly valve is fully open or almost so. A longitudinal slot 20 is provided in the sleeve 13 to enable the passage of the finger 18, as well as the angular movements of the latter.

The actuating mechanism 11 comprises also a link 21 of which one end is articulated on a pivot 22 mounted in the sleeve 13, at the end of the portion of the latter which projects into the pipe 5. On the other end of the link 21 is articulated the portion of the valve 10 situated, when the latter is open, closest to the intake port 6. More exactly, this portion of the valve bears a lug 23, perpendicular to the plane of the valve, hinged on the link 21.

The pivot 22 is mounted in a housing 24 elongated in the direction of the axis of the sleeve 13. This housing 24 is constituted by the space comprised between, on one hand, a foot 25 extending the end of the sleeve 13 and provided with a lip extending radially towards the axis of the said sleeve 13 and, on the other hand, a zone of the outer surface of the rod 12 situated facing the said foot 25. The lip of the foot 25 prevents the pivot 22 from emerging from the housing 24, longitudinally, towards the intake port 6. However, the said pivot 22 can be moved between the two longitudinal extremities of the housing 24.

Elastic return means (not shown) can be provided, which act on the pivot 22 and tend to space it from the intake port 6.

It will be noted that a flat annular seat 26 for the valve 10 (FIG. 1) is provided in the intake pipe 5 slightly withdrawn from the inner peripheral surface 3. The average distance between the plane of the seat 26 and the said inner surface 23 is precisely equal to $d$ (FIG. 2). To fix ideas, it may be stated that $d$ is of the order of several millimeters, three or four for example.

When the carburetter mounted on the intake pipe 5 is a dual carburetter with one intake pipe (not shown) for the supply at slow speed and at partial load, and a second intake pipe, corresponding to the pipe 5 shown, for the supply at full load, the valve 10 is arranged in the second pipe and is adapted to close it completely when the engine operates at slow speed or at partial load or in deceleration.

When the carburetter, mounted on the intake pipe 5, is a single carburetter, the valve 10 is designed to enable, when it is closed, the supply when the butterfly valve is partly opened, for example at slow speed or at partial load.

This being the case, the operation of the obturating device according to the invention is as follows.

There will first be considered the case where the valve 10 passes from its open position, shown in FIG. 1, to its closed position shown in FIG. 2.

This case corresponds, for example, to that of deceleration : by releasing the accelerator control, the butterfly valve (not shown) previously open, is closed and the engine is caused to pass from full load to very slight or nul load.

The release of the accelerator control causes the rotation of the finger 18 in anticlockwise direction. The element 17 pushes the rod 12 from the left to the right of FIG. 1. By reason of the friction or, when the elastic return means are provided to act on the pivot 22, by reason of these eleastic means, the said pivot 22 is held in the portion of the housing 24 most spaced from the intake port 6. Under these conditions, the lug 23 will describe an arc of a circle centered on the pivot 22 and of which the radius is equal to the length of the link 21. At the same time, the yoke 14, which is moved longitudinally with the rod 12, actuates in its movement of translation the axle on which the lug 15 is articulated. The latter has therefore a combined movement of translation due to the movement of the rod 12 and a movement of rotation due to the action of the link 21 on the lug 23. As a result, for the valve 10, there is a tilting movement, around the axle bearing the lug 15, in anticlockwise direction.

The assembly is arranged so that, when the valve 10 has turned through an angle substantially equal to 90° and is oriented transversely to the axis of the pipe 5, the tilting of the said valve in anticlockwise direction is prevented either by cooperation of the yoke 14 and of a portion of the valve, or by cooperation of the portion of the valve 10, diametrically opposite to the lug 23, and the portion of the seat 26 situated nearest the exhaust pipe 7.

Under these conditions, supplementary movement of the rod 12 towards the intake port 6 causes, on one hand, a longitudinal movement of the pivot 22, in the housing 24, towards the intake port 6 and, on the other hand, the full application of the valve 10 against the seat 26 and the closing of the intake port 6. This final phase of the movement can be a translation of the valve 10 along a direction parallel to the axis of the sleeve, in which case the whole periphery of the said valve 10 is applied simultaneously on the seat 26. This translation can be obtained when the said valve 10 is prevented from turning in anticlockwise direction by co-operation of the lug 15 (or of the middle portion of the said valve) with the yoke 14.

It is absolutely essential to note that in the course of its closing movement, neither the valve 10 nor any of its parts project at any time into the working chamber 4.

It must be noted also that the dead space of the intake pipe 5 into which the burnt gases can be introduced is extremely reduced, when the valve is closed, by reason of the small value of the distance $d$.

From the beginning of closing of the valve 10, that is to say as soon as the engine no longer operates at full load, efficient throttling of the intake pipe 5 is obtained since the initial phase of the movement of the valve 10 comprises the rotary movement of the latter in anticlockwise direction around the axle bearing the lug 15.

Passage of the valve 10 from its closed position (FIG. 2) to its open position (FIG. 1) is immediately apparent from the previously given explanations.

When full opening of the butterfly valve (not shown) is actuated so that the engine passes from partial load to full load, finger 18, from the position that it occupies in FIG. 2, will turn in clockwise direction and will displace the rod 12 from the right to left of FIG. 2.

Pivot 22 no longer being in abutment against the bottom of the housing 24, the displacement of the yoke 14 and of the lug 15 from the right to left FIG. 2 will cause, especially if said pivot 22 is subject to the action of elastic return means previously envisaged, the movement of the said pivot 22 in the housing 24 in a direction parallel to the axis of the sleeve 13. It will be the same for the lug 23 so that the valve 10, at the beginning of its opening, has a movement of translation until the pivot 22 comes into abutment against the portion of the housing 24 spaced from the intake port 6.

From this moment, the pivot 22 no longer being displaced, the lug 23 will describe, around the said pivot, in clockwise direction, an arc of a circle. There results, for the valve 10, a tilting movement in clockwise direction around the axle of the lug 15, which axle has a movement of translation from right to left of FIG. 2.

In the course of opening, the valve 10 is oriented substantially along the axis of the intake pipe and does not project by any of its parts into the free working chamber 4.

The passage open to the flow of fresh gas coming from the carburettor is maximal which is favorable for operation at full load.

As result of which, there is obtained an obturating device for the intake pipe which responds well to the desired purpose and which it had been sought to attain, namely, reduction to a minimum value, when the closing of the obturating device is complete, of the dead space in the intake pipe into which the burnt gases can penetrate.

In addition, as soon as the engine no longer oprates at full load, the obturating device ensures efficient throttling of the said intake pipe, by reason of the rapid tilting movement of the valve 10, limiting the entry of the burnt gases.

As is self-evident, and as emerges already from the foregoing, the invention is in no way limited to those of its methods of application, nor to those of its methods of production of its various parts, which have been more especially indicated; it encompasses, on the contrary, all variations thereof.

I claim:

1. Obturating device for the intake pipe of an internal combustion engine, said engine being supplied with fuel through a supply device comprising means adapted to ensure suitable metering of air and of fuel under all conditions of operation of said engine and being provided with at least one intake port and one exhaust port of which the opening and closing are actuated by the piston of the engine, said intake and exhaust ports communicating with one another during a fraction of a cycle, said obturating device comprising a valve actuated by a mechanism arranged so that said valve can be fully opened and oriented in a direction substantially parallel to the axis of the intake pipe at the level of the valve and can be oriented transversely to said axis to close the intake pipe at a distance from the peripheral surface of the combustion chamber of the engine less than one half of the dimension along the said axis of the valve when the latter is fully open, the assembly being such that the said valve cannot project into the combustion chamber of the engine, whether it is open or closed or in an intermediate position, said actuating mechanism comprising a rod adapted to slide in a sleeve, inclined on said axis towards the intake port, one end of the said rod projecting into said intake pipe, the middle portion of the said valve being articulated on said one end, the other end of the rod being connected to a member actuating the longitudinal movements of the said rod and a link member of which one end is articulated in a pivot mounted in said sleeve and on the other end of which is articulated the portion of the valve situated, when the latter is open, closest to the intake port.

* * * * *